May 1, 1923.

H. KNIPPEL

REAR SPRING SUPPORT FOR AUTOMOBILES

Filed June 5, 1922

1,453,467

HENRY KNIPPEL INVENTOR.

BY

*Emil F. Lange*

ATTORNEY.

Patented May 1, 1923.

1,453,467

UNITED STATES PATENT OFFICE.

HENRY KNIPPEL, OF LINCOLN, NEBRASKA.

REAR-SPRING SUPPORT FOR AUTOMOBILES.

Application filed June 5, 1922. Serial No. 565,939.

*To all whom it may concern:*

Be it known that I, HENRY KNIPPEL, a citizen of the United States, residing at Lincoln, in the county of Lancaster and State of Nebraska, have invented certain new and useful Improvements in Rear-Spring Supports for Automobiles, of which the following is a specification.

My invention relates to a rear spring support for Ford cars and its primary object is the provision of a spring mount and spring which will materially increase the comfort of the occupants of the car when the car is in motion. Incidentally I combine with the spring support a very effective rear bumper and a baggage carrier.

The Ford car is provided by the manufacturer with a spring which is mounted transversely over the rear axle. Because of its location it is necessarily short and weak and results in much unnecessary vibration in the car. My invention includes an attachment which can be attached to the rear of a Ford car, and which is designed to hold the springs in a more or less longitudinal alignment with respect to the car. The attachment projects rearwardly and carries at its rear end a bumper, and the entire top of the attachment is made flat and level to facilitate its use as an article carrier.

Having in view these and other objects which will appear in the description, I will now refer to the drawings, in which—

Figure 1:
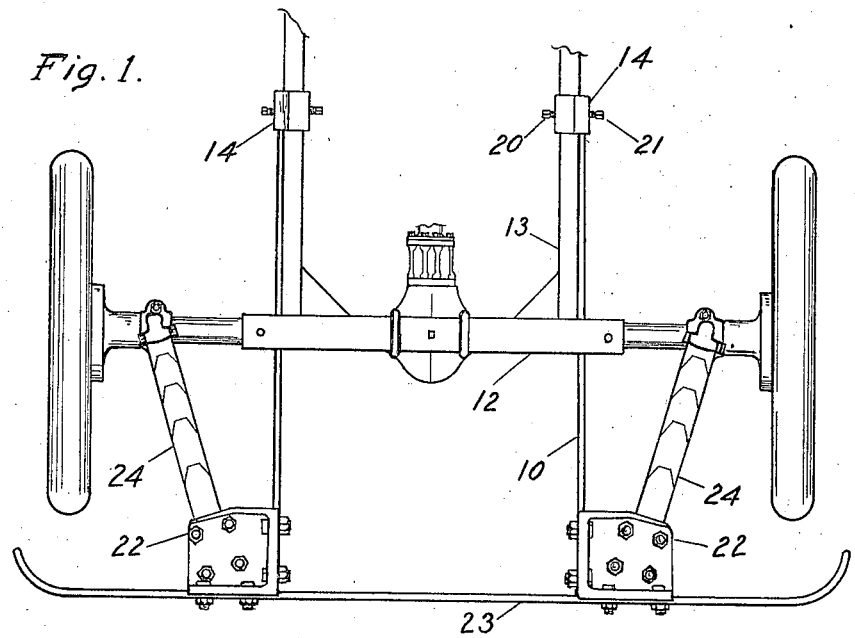
Figure 1 is a top plan view of my attachment in place on the chassis of the Ford car.
Figure 2:
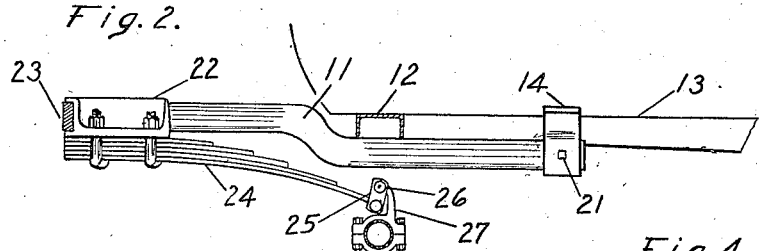
Figure 2 is a side elevation of the same.
Figure 3:
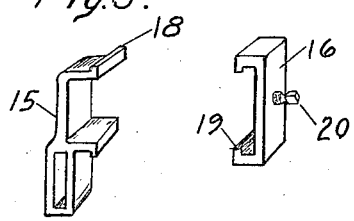
Figure 3 is a detail view of the clamp for securing the front end of my attachment to the side beams of the frame of the car.
Figure 4:
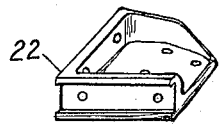
Figure 4 is a detail view of the rear corner connections of my attachment.

My attachment includes two side beams 10 secured at their forward ends to the side beams of the frame of the car. The rear portions of the beams 10 are in horizontal alignment with the side beams of the car, but they are bent at 11 where they pass forwardly under the rear beam 12 of the car and beneath and to the outside of the side beams 13 of the car. At their forward ends they are clamped to the beams 13 by means of the clamps 14. As shown in Figure 3, each of these clamps consists of two parts 15 and 16. The part 15 is provided with a suitable aperture 17 for the reception of the end of the beam 10, the upper end of the part 15 being adapted to fit over the side of the beam 13. The parts 15 and 16 have a sliding connection 18—19 for holding them together. When the parts are properly adjusted in assembled relation, the set screw 20, with its end bearing against the beam 13, is tightened, and the set screw 21 is also tightened to secure the beam 10 against displacement.

Bolted securely to the rear ends of the beams 10 are castings 22. These castings are heavily ribbed for strengthening purposes, and joining and secured to the rear ribs of the castings 22 is the bumper bar 23. I clamp the rear and heavy end of the spring 24 to the under side of the casting. The forward end of the spring is secured to the lower end of a link 25 which is pivoted at its upper end at 26 to an upwardly projecting portion 27 of a clamp on the rear axle of the car.

From the foregoing description it will be seen that I have provided an attachment which while designed primarily for Ford cars, will with slight modifications be equally useful on certain other makes of cars. The attachment projects rearwardly to a distance back of the car and serves as a support for the rear ends of two springs mounted longitudinally of the car. The length of these springs is preferably greater than the length of the spring usually found on the Ford car and because of its greater length, a stronger spring may be installed. In the case of the transverse springs only a portion of the spring is effective, but when mounted as I have shown it, every portion of the spring functions. The rear bar 23 serves to hold all parts of the attachment in place and serves also as a bumper to protect the rear of the car. The upper surface of the attachment is flat and preferably open. It is large enough to accommodate a trunk, and small articles or small pieces of baggage may be roped on to the upper surface of the attachment. It is understood however that I do not desire to restrict myself to the exact form shown nor to the dimensions, as these may be varied in a number of ways, depending on the design of the car and also on the uses to which it is desired to make of the attachment.

Having thus described my invention and its uses and advantages, what I believe to be new and desire to secure by Letters Patent of the United States is: —

1. An attachment for vehicles comprising springs which are adapted to be mounted in pairs and substantially longitudinally of the vehicle with their forward ends diverging, means for securing the front ends of said springs to the rear axle of the vehicle, forwardly extending beams having their rear ends secured to the rear ends of said springs, clamping means for adjustably clamping the front ends of said beams to the side beams of the vehicle, and a rigid connection between the rear ends of said springs, said connection projecting beyond the springs at both of its ends, said connection also being positioned to the rear of the body of the vehicle.

2. An attachment for vehicles comprising clamps which are adapted to be secured to the rear axle of a vehicle, links pivoted at one of their ends to each of said clamps, springs secured at their forward ends to the free ends of said links, forwardly extending beams secured at their rear ends to the rear ends of said springs, the rear portions of said beams being disposed to one side of but in horizontal alignment with the side beams of the vehicle, the forward portions of said beams passing underneath the rear beam of the vehicle and forwardly to a point in advance of the rear axle of the vehicle, means for securing the forward ends of the said beams to the side beams of the vehicle, and a cross beam connecting the rear ends of the aforesaid beams, said cross beam serving as a rear bumper for the vehicle.

3. An attachment for vehicles comprising a rear beam and side beams secured thereto, clamping means for securing the forward ends of said side beams to the side beams of the vehicle, said clamping means including a part for receiving the side beam of the attachment and the side beam of the vehicle and a second part slidably connected to the first said part of the clamp, clamps on the rear axle of the vehicle, and springs secured at their ends to said clamps and to said rear beam of the attachment.

In testimony whereof I affix my signature

HENRY KNIPPEL.